(12) United States Patent
Medalion et al.

(10) Patent No.: US 11,315,076 B2
(45) Date of Patent: Apr. 26, 2022

(54) SYSTEMS AND METHODS FOR INITIAL INVENTORY TEMPLATE GENERATION FOR ACCOUNTING PLATFORMS

(71) Applicant: Intuit Inc., Mountain View, CA (US)

(72) Inventors: Shiomi Medalion, Tel Aviv (IL); Yair Horesh, Tel Aviv (IL); Yehezkel Shraga Resheff, Tel Aviv (IL); Alexander Zhicharevich, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 310 days.

(21) Appl. No.: 16/732,891

(22) Filed: Jan. 2, 2020

(65) Prior Publication Data

US 2021/0209545 A1 Jul. 8, 2021

(51) Int. Cl.
*G06Q 10/08* (2012.01)
*G06F 40/186* (2020.01)
*G06F 16/23* (2019.01)
*H04L 67/01* (2022.01)

(52) U.S. Cl.
CPC ........... *G06Q 10/087* (2013.01); *G06F 16/23* (2019.01); *G06F 40/186* (2020.01); *H04L 67/42* (2013.01)

(58) Field of Classification Search
None
See application file for complete search history.

(56) References Cited

U.S. PATENT DOCUMENTS

2021/0350069 A1* 11/2021 Selinger .................. H04L 67/28

* cited by examiner

*Primary Examiner* — Paul Danneman
(74) *Attorney, Agent, or Firm* — DLA Piper LLP (US)

(57) ABSTRACT

Systems and methods that may be used to automatically generate inventory templates for use with an accounting platform. The automatically generated templates may be for a first user within a particular industry and may be based on established inventory trees of other system users within the same industry that have similar demographics of the first user.

20 Claims, 5 Drawing Sheets

SYSTEMS AND METHODS FOR INITIAL INVENTORY TEMPLATE GENERATION FOR ACCOUNTING PLATFORMS

BACKGROUND

It is known that inventory management can be very complex. As such, there are many accounting systems and or applications in the field that help users organize and manage their inventory. But these systems are also complex. They typically require a user to enter four or more levels of information to categorize its products (e.g., level 1: electronics; level 2: cell phone; level 3: brand name; and level 4: model). Thus, there are multiple opportunities for errors. Moreover, the process is time consuming as it must be done manually, item by item, for every item of the user's inventory.

Internally, the accounting system and or application creates inventory trees corresponding to the levels of categorization used to represent the user's inventory. There are numerous ways to express an inventory tree, some are more elegant and or efficient than others. Unfortunately, the task of initializing the inventory tree structure is both time consuming and prone to errors as it is based on the manual item-by-item, level-by-level, entry of the user's inventory.

Accordingly, there is a need and desire to speed up and minimize errors during the inventory initialization process.

DETAILED DESCRIPTION OF SEVERAL EMBODIMENTS

Embodiments described herein may be used to automatically generate and output high-quality and relevant inventory templates to users of an accounting system or application. The user's industry may be used to mine prior sets of inventory trees belonging to experienced users within the same industry and with other matching demographics (e.g., number of employees or location). A majority-rule consensus tree may be generated from the mined inventory trees and may be used as the basis for the current user's initial inventory template.

In one or more embodiments, systems and methods for automatically generating and outputting high-quality and relevant inventory templates to users of an accounting system or application are provided. In one or more embodiments, when a user registers with the accounting system and or application disclosed herein, the user may be prompted to identify its industry category (e.g., cell phone dealer) and a provide a description of its intended inventory and or other demographic information. When the user provides this information, it may be offered automatically generated inventory templates having pre-populated anticipated inventory items based on the disclosed system's industry knowledge. For example, in or more embodiments, sets of inventory trees belonging to experienced users within the same industry and with other matching demographics (e.g., number of employees or location) may be collected. Once these sets are collected and processed, a majority-rule consensus tree (i.e., a tree having nodes and structure shared by a predetermined percentage of the collected trees) may be built and used as the basis for the user's initial inventory template.

An example computer implemented method for automatically generating an inventory template for an inventory system may be performed on a computing device and comprises: inputting, over a network connection, an industry associated with a first user of the inventory system; inputting a plurality of inventory trees stored in a database, the plurality of inventory trees being associated with system users determined to be within a similar industry as the industry associated with the first user; sampling a subset of the plurality of inventory trees to obtain one or more features of the sampled subset in which there is a consensus that the features belong to the industry associated with the first user; creating a consensus inventory tree from the one or more features of the sampled subset; and populating the inventory template based on contents of the created consensus tree before providing the inventory template to the first user.

Figure 1:
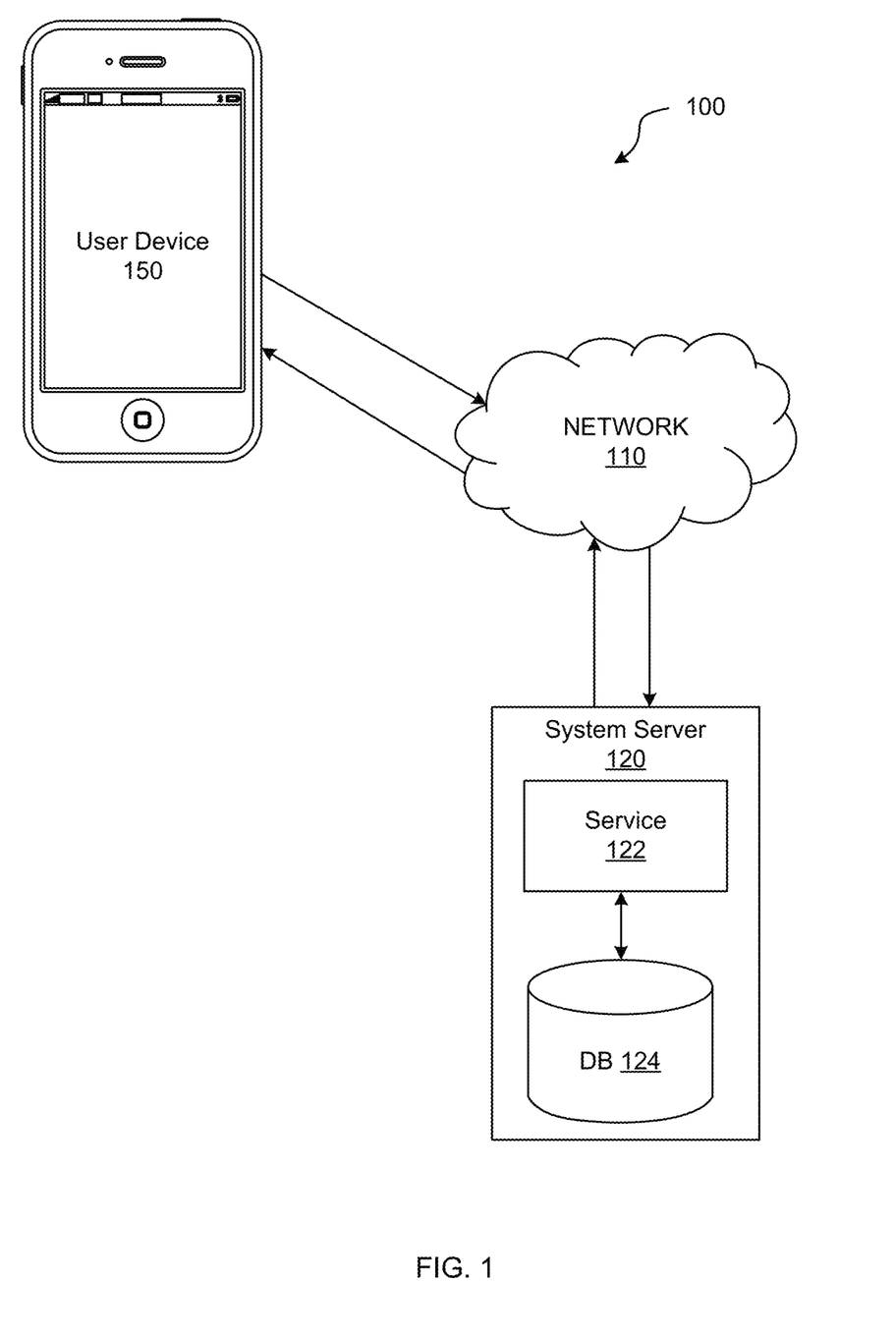
FIG. 1 shows an example of a system configured to generate inventory templates in accordance with an embodiment of the present disclosure.

FIG. 1 shows an example of a system 100 configured to implement the process for generating inventory templates according to an embodiment of the present disclosure. System 100 may include a system server 120 and/or a user device 150. System server 120 and user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

System server 120 may be configured to implement a system service 122, which in one embodiment may be used to input inventory trees and other industry related inventory data from one or more of database 124 and/or user device 150. For example, system server 120 may execute the process for generating inventory templates using the inventory trees and or other industry related inventory data stored in system database 124 and or received from user device 150. System service 122 may implement an information service, which may maintain data concerning one or more system users' inventory trees. The information service may be any network 110 accessible service that implements an accounting and or inventory management service. For example, the information service may include QuickBooks®, QuickBooks Self-Employed®, and QuickBooks Online® by Intuit® of Mountain View Calif.

User device 150 may be any device configured to present user interfaces and receive inputs thereto. For example, user device 150 may be a smartphone, personal computer, tablet, laptop computer, or other device.

System server 120, system database 124 and user device 150 are each depicted as single devices for ease of illustration, but those of ordinary skill in the art will appreciate that system server 120, system database 124 and/or user device 150 may be embodied in different forms for different implementations. For example, system server 120 may include a plurality of servers or one or more system databases 124. Alternatively, the operations performed by system server 120 may be performed on more servers. In another example, a plurality of user devices 150 may communicate with system server 120. A single user may have multiple user devices 150, and/or there may be multiple users each having their own user device(s) 150.

Figure 2:
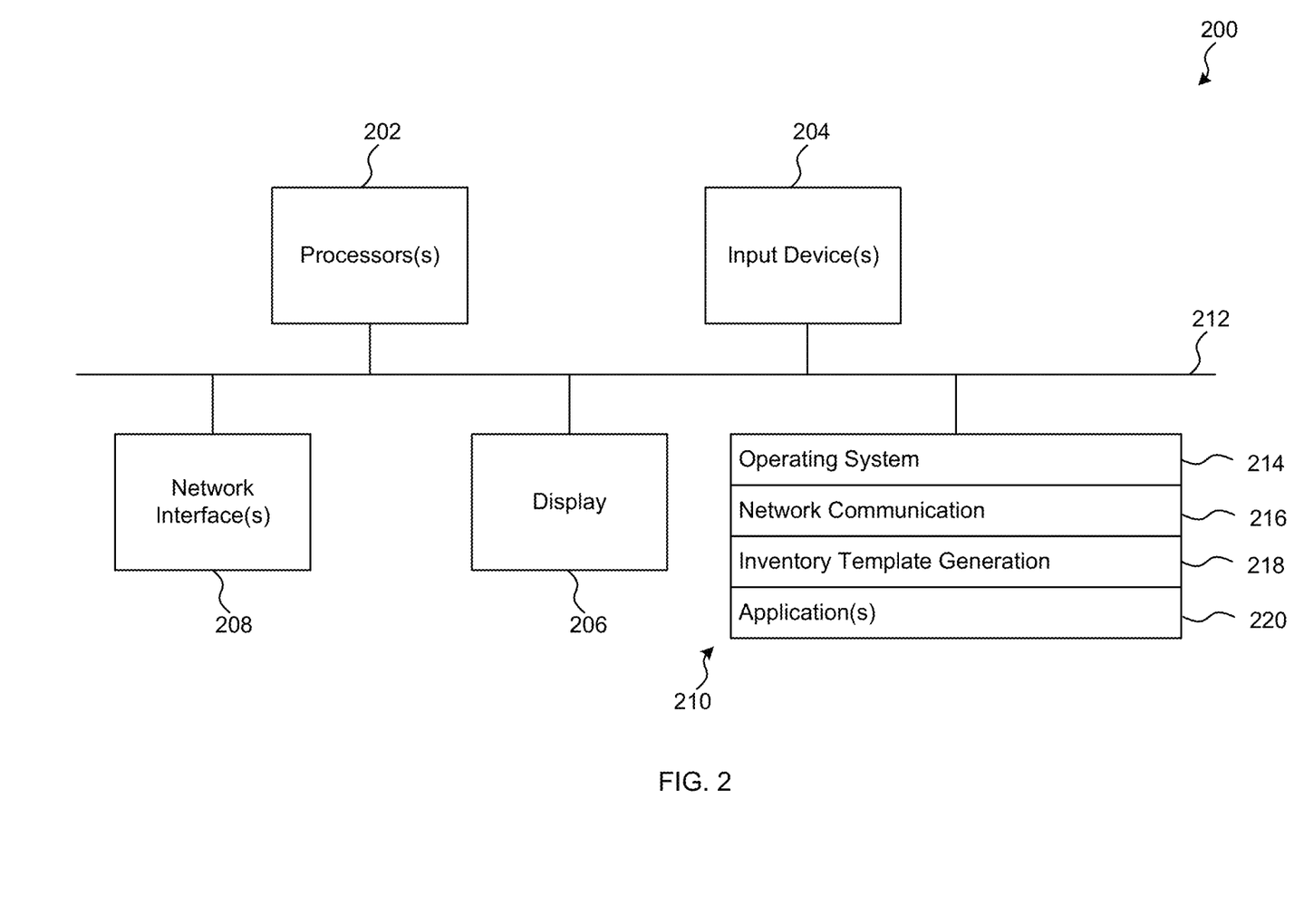
FIG. 2 shows a server device according to an embodiment of the present disclosure.

FIG. 2 is a block diagram of an example computing device 200 that may implement various features and processes as described herein. For example, computing device 200 may function as system server 120 in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Inventory template generation instructions 218 may include instructions that implement the disclosed process for generating inventory templates as described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
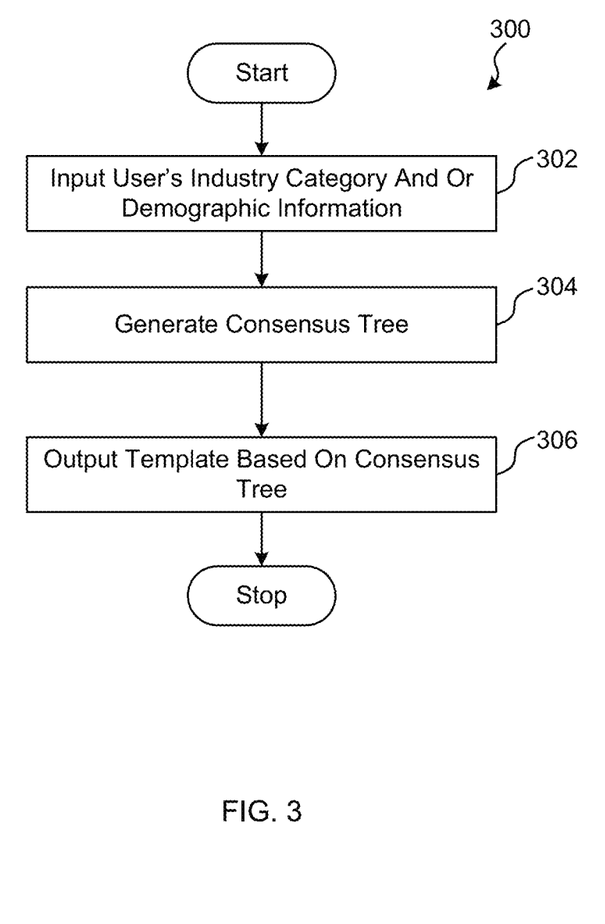
FIG. 3 shows an example process for generating inventory templates according to an embodiment of the present disclosure.

FIG. 3 illustrates an example process 300 for generating inventory templates according to an embodiment of the present disclosure. In one embodiment, system 100 may perform some or all of the processing illustrated in FIGS. 3 and 4. Moreover, during the execution of the disclosed process 300, system server 120 may input inventory trees and other industry related inventory data associated with other system users from a database, which may be the system database 124.

In one embodiment, the process 300 may be initiated when a user registers with a system 100 in accordance with the disclosed principles. For example, the registration process may initially prompt the user for, and input based on the user's response, a user name and password allowing the user to access various aspects of the system 100. While the user is being registered, the process 300 may be activated and at step 302 the user may be prompted to input an industry category associated with the user's business. The user may also be prompted to enter other information such as a further description of its business or inventory, demographic information such as number of employees and or location of the business. This information is input at step 302 and may be used by the process 300 to create an initial inventory template for the user.

Figure 4:
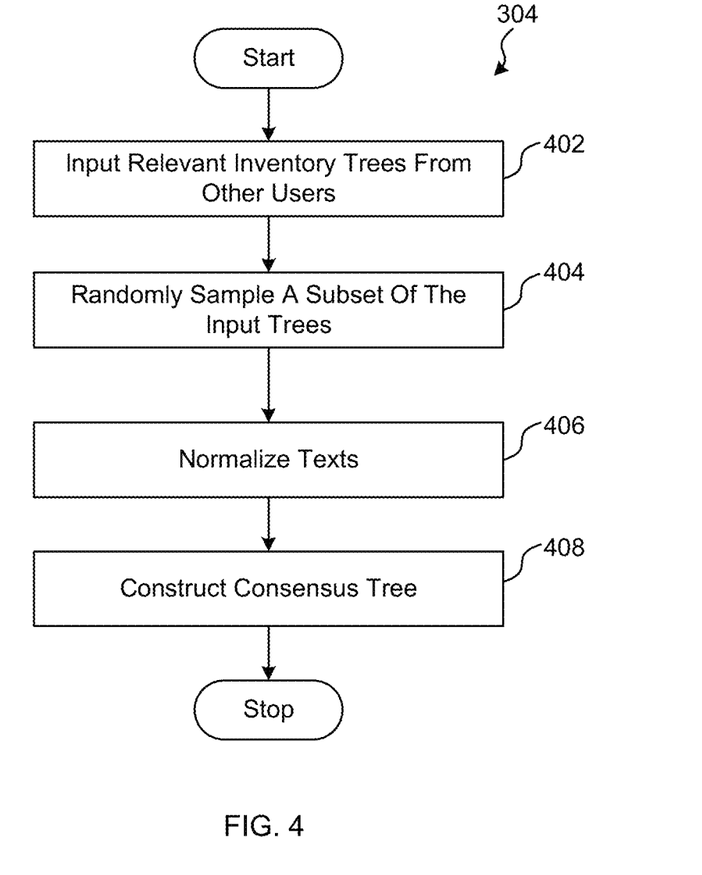
FIG. 4 shows an example process for generating a majority consensus inventory tree that may be utilized in the process for generate inventory templates shown in FIG. 3.

For example, after inputting the user's industry category, description of its business and or inventory, and or demographic information, the process 300 at step 304 may generate a consensus tree based on inventory trees determined by the process 300 to belong to experienced users within the same industry and with other matching demographics as described in more detail with respect to FIG. 4. In one embodiment, the consensus tree may be a majority-rule consensus tree, which in one or more embodiments may consist of nodes and structure shared by a predetermined percentage of the inventory trees of the experienced users within the same industry and with other matching demographics. In one or more embodiments, the generated consensus tree may be stored in the system database 124 or in any storage associated with the system 100.

At step 306, the process 300 may output an initial inventory template based on the consensus tree generated at step 304. The initial inventory template may include pre-populated item-by-item, category level-by-level, inventory based on the nodes and structure within the consensus tree. As can be appreciated, because the user's initial inventory tree is generated and populated automatically, system processing load is reduced as the conventional complex back and forth user interaction (via multiple interactive user interfaces) normally required to input and setup the user's inventory structure is skipped. Moreover, errors associated with the conventional process are avoided, making the process 300 more efficient and accurate from the get go. Thus, the disclosed principles provide an improvement to the online accounting and inventory maintaining fields.

Although not shown in FIG. 3, the process 300 may provide the user with the opportunity to confirm items in the template (i.e., confirm that the items are appropriate for the user's inventory) and or modify the inventory by e.g., adding and or removing items, and or changing the description of pre-populated inventory items.

FIG. 4 shows an example consensus tree generation process 304 that may be utilized in the process 300 for generating inventory templates shown in FIG. 3. The process 304 may begin at step 402 by inputting already established inventory trees from other system users within the same industry as the current user. The inventory trees from other system users determined to be within the same industry maybe referred to herein as "relevant inventory trees." In one or more embodiments, the process 304 only collects inventory trees from users determined to have been managing an inventory via the system 100 for at least a predetermined period of time. The users that have been determined as managing an inventory via the system 100 for at least a predetermined period of time may be referred to herein as "experienced users." In one or more embodiments, the predetermined period of time may be a year or more.

At step 404, the process 304 may randomly sample a subset of the inventory trees input at step 402. In one or more embodiments, the number of inventory trees sampled at step 404 may be a predetermined number of trees. For example, in one or more embodiments, the predetermined number of previously established inventory trees sampled at step 404 may be 1,000 or more.

In one or more embodiments, the inventory trees may be sampled for each tuple of (1) industry; (2) size of the user's business or inventory (e.g. very small, small, medium, large); and (3) location (e.g., as shown by the users' first two digits of their zip code). In one or more embodiments, a consensus threshold may be used to indicate a minimal amount of agreement between the trees sampled (i.e., a consensus is determined). For example, the consensus threshold may refer to a tradeoff of demanding strong or weak agreement between the members forming the consensus tree. As a result, one may obtain larger trees (e.g., that look for weaker consensus) or smaller trees (e.g., that look for stronger consensus). The threshold itself may be any method or algorithm and or may be domain specific, that may be tuned by trial and error. In one or more embodiments, the consensus threshold may be about 20% to 30% of the trees sampled.

Use of a large subset (e.g., 1,000 or more) of previously established inventory trees from experienced users may help the process 304 establish a more accurate consensus tree as more sample sets are being used and the sample sets are taken from established users, rather than new or inexperienced users. However, it should be appreciated that the principles disclosed herein should not be limited to any specific number of previously established inventory trees in the sampled subset, a specific period of time categorizing users as experienced users, or a specific consensus threshold.

At step 406, the process 304 may normalize texts within the trees. For example, at step 406, the trees may undergo stemming and or the removal of digits. At step 408, the process 304 may construct a consensus tree for each tuple (e.g., (1) industry; (2) size of the user's business or inventory; and (3) location). It is known in the art that a consensus tree is a phylogenetic tree that summarizes a given collection of phylogenetic trees having the same leaf labels, but different branching structures. Consensus trees may be used to resolve structural differences between two or more existing phylogenetic trees arising e.g., from conflicts in the raw data, to find strongly supported groupings, and to summarize large sets of candidate trees. There are many types of consensus trees, stemming from the rules governing how they are generated. Examples include the strict consensus tree, majority-rule consensus tree and the R* consensus tree.

In one or more embodiments, the process 304 will create a majority-rule consensus tree based on the sample set of inventory trees. One suitable method for creating a majority-rule consensus tree may be the method disclosed by Jansson et al., "Algorithms for the Majority Rule (+) Consensus Tree and the Frequency Difference Consensus Tree" in Darling A., Stoye J. (eds) Algorithms in Bioinformatics, WABI 2013, Lecture Notes in Computer Science, vol 8126. It should be appreciated, however, that the disclosed principles should not be limited to the manner in which the consensus tree is created or type of consensus tree created.

Figure 5:
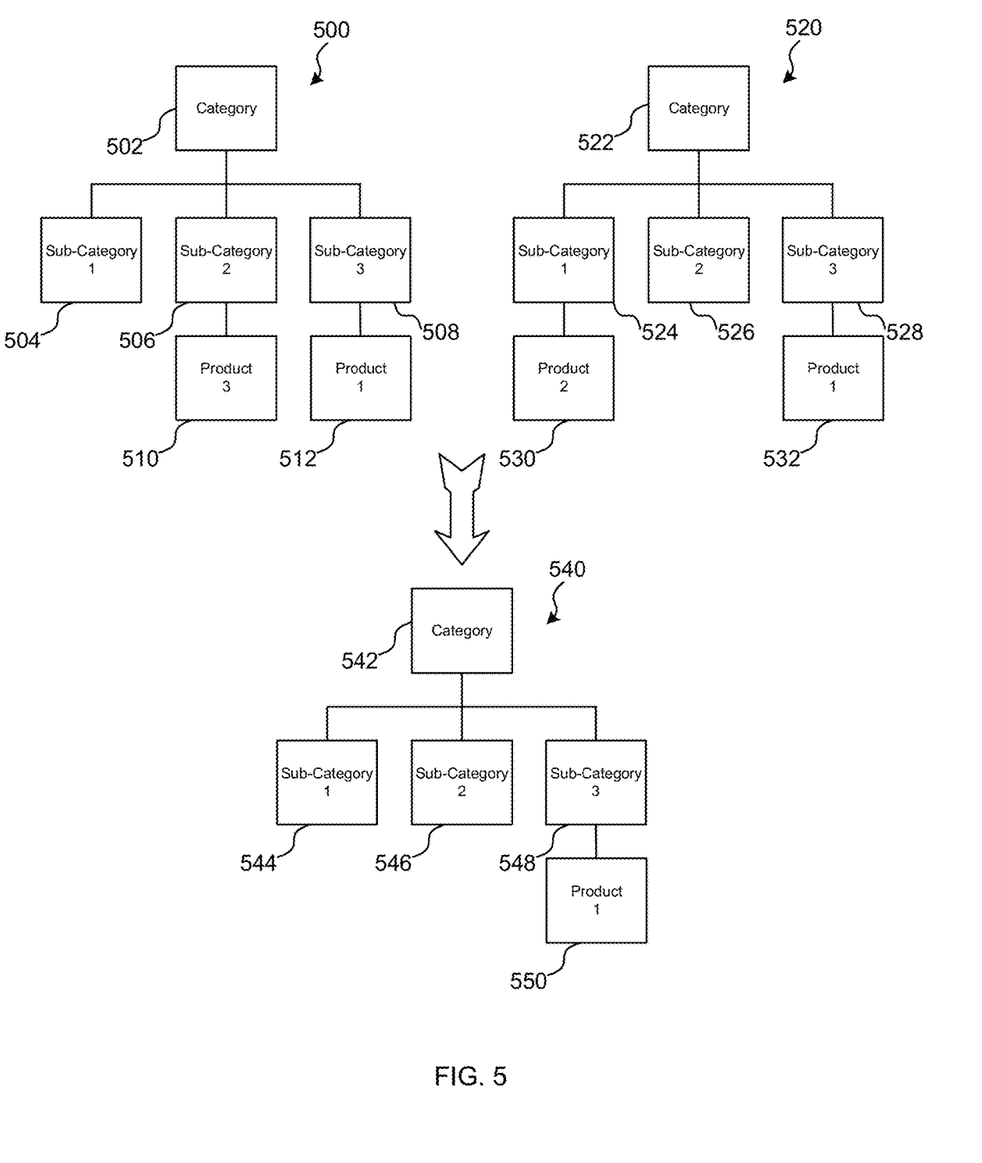
FIG. 5 shows an example illustrating the formation of a majority consensus inventory tree according to an example of the disclosed principles.

FIG. 5 shows an example illustrating the formation of a consensus inventory tree 540 according to an example of the disclosed principles. In the illustrated simplified example, the consensus inventory tree 540 results from the mining and processing of a first inventory tree 500 and a second inventory tree 520. As noted above, the generation of the consensus tree 540 may be based on 1,000 or more randomly sampled inventory trees of experienced users. In the illustrated example, the first inventory tree 500 comprises a first level node 502, representing an inventory category (e.g., electronics). The first level node 502 is connected to three second level nodes 504, 506, 508, representing first, second and third sub-categories (e.g., cell phones, cases, chargers). In the illustrated example, node 506 is connected to a third level node 510 representing a product identified as "product 3" (e.g., a particular brand name or model of a cell phone case). In addition, node 508 is connected to a third level node 512 representing a product identified as "product 1" (e.g., a particular brand name or model of a cell phone charger).

In the illustrated example, the second inventory tree 520 comprises a first level node 522, representing an inventory category (e.g., electronics). This may be the same category as the category identified by first level node 502 in the first inventory tree 500. The first level node 522 is connected to three second level nodes 524, 526, 528, representing first, second and third sub-categories (e.g., cell phones, cases, chargers). In the illustrated example, node 524 is connected to a third level node 530 representing a product identified as "product 2" (e.g., a particular brand name or model of a cell phone). In addition, node 528 is connected to a third level node 532 representing a product identified as "product 1" (e.g., a particular brand name or model of a cell phone charger). In the illustrated example, node 532 represents the same "product 1" represented by node 512 of the first inventory tree 500.

In the illustrated example, process 304 was run using the first and second inventory trees 500, 520 and created the consensus inventory tree 540. In the illustrated example, consensus inventory tree 540 is a majority-rule consensus inventory tree. As shown in FIG. 5, the consensus inventory tree 540 comprises a first level node 542, representing the inventory category (e.g., electronics), which is the same category as nodes 502, 522 of the first and second inventory tress 500, 520. The first level node 542 is connected to three second level nodes 544, 546, 548, representing the same first, second and third sub-categories (e.g., cell phones, cases, chargers) contained in the first and second inventory tress 500, 520. In the illustrated example, node 548 is connected to a third level node 550 representing a product identified as "product 1" (e.g., a particular brand name or model of a cell phone charger). This is the same "product 1" found in the third level nodes 508, 528 of the first and second inventory tress 500, 520.

As can be seen, because node 504 of the first inventory tree 500 did not branch to a third level node that could have matched a branched third level node from node 524 in the second inventory tree 520, the consensus inventory tree 540 did not have a third level node that branched from node 544. Likewise, because node 506 of the first inventory tree 500 did not branch to a third level node that could have matched a branched third level node from node 526 in the second inventory tree 520, the consensus inventory tree 540 did not have a third level node that branched from node 546. Instead, only node 548 branched to a third level node 550 based on the similarities between nodes 512 and 532.

As can be appreciated, the principles disclosed herein may provide an initial inventory template that may include pre-populated item-by-item, category level-by-level, inventory based on the nodes and structure within the consensus tree. As can be appreciated, because the user's initial inventory tree is generated and populated automatically, system processing load is reduced as the conventional complex back and forth user interaction (via multiple interactive user interfaces) normally required to input and setup the user's inventory structure is skipped. Moreover, errors associated with the conventional process are avoided, making the process 300 more efficient and accurate than conventional accounting and inventory systems. These are major improvements in the technological art as it improves the functioning of the computer and is an improvement to the technology and technical fields of online accounting and inventory systems.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for automatically generating inventory templates for an inventory system, said method being performed on a computing device, said method comprising:

inputting, over a network connection, an industry associated with a first user of the inventory system;

inputting a plurality of inventory trees stored in a database, the plurality of inventory trees being associated with system users determined to be within a similar industry as the input industry associated with the first user;
sampling a subset of the plurality of inventory trees to obtain one or more features of the sampled subset in which there is a consensus that the one or more features belong to the industry associated with the first user;
creating a consensus inventory tree from the one or more features of the sampled subset; and
populating the inventory template based on contents of the created consensus tree before providing the inventory template to the first user.

2. The method of claim 1, wherein said step of inputting the plurality of inventory trees further comprises determining whether the inventory trees are associated with similar demographics as the first user.

3. The method of claim 1, wherein said step of inputting the plurality of inventory trees further comprises determining whether the inventory trees are associated with a similar location as the first user.

4. The method of claim 1, wherein said step of inputting the plurality of inventory trees further comprises determining whether the inventory trees are associated with a similar sized inventory as the first user.

5. The method of claim 1, wherein said step of inputting the plurality of inventory trees further comprises:
determining whether the inventory trees are associated with system users operating with the system for at least a predetermined amount of time; and
inputting the inventory trees associated with system users determined to be operating with the system for the at least the predetermined amount of time.

6. The method of claim 1, wherein said step of sampling the subset of the plurality of inventory trees comprises sampling inventory trees based on a one or more of industry, size of the inventory or location associated with each tree.

7. The method of claim 1, wherein said step of sampling the subset of the plurality of inventory trees comprises sampling inventory trees based on industry, size of the inventory and location associated with each tree.

8. The method of claim 1, further comprising normalizing texts within the sampled subset before creating the consensus inventory tree.

9. The method of claim 1 wherein said step of sampling the subset of the plurality of inventory trees comprises determining the consensus and wherein determining the consensus comprises determining that the one or more features are shared in a predetermined percentage of the sampled subset.

10. The method of claim 1, wherein the step of creating the consensus inventory tree from the one or more features of the sampled subset comprises creating a majority-rule consensus inventory tree from the one or more features of the sampled subset.

11. A system for automatically generating an inventory template for use with said system, said system comprising:
a first computing device connected to a second computing device through a network connection, the first computing device configured to:
input, over the network connection, an industry associated with a first user of the inventory system;
input a plurality of inventory trees stored in a database, the plurality of inventory trees being associated with system users determined to be within a similar industry as the input industry associated with the first user;
sample a subset of the plurality of inventory trees to obtain one or more features of the sampled subset in which there is a consensus that the one or more features belong to the industry associated with the first user;
create a consensus inventory tree from the one or more features of the sampled subset; and
populate the inventory template based on contents of the created consensus tree before providing the inventory template to the first user.

12. The system of claim 11, wherein said first computing device is configured to input the plurality of inventory trees by determining whether the inventory trees are associated with similar demographics as the first user.

13. The system of claim 11, wherein said first computing device is configured to input the plurality of inventory trees by determining whether the inventory trees are associated with a similar location as the first user.

14. The system of claim 11, wherein said first computing device is configured to input the plurality of inventory trees by determining whether the inventory trees are associated with a similar sized inventory as the first user.

15. The system of claim 11, wherein inputting the plurality of inventory trees further comprises:
determining whether the inventory trees are associated with system users operating with the system for at least a predetermined amount of time; and
inputting the inventory trees associated with system users determined to be operating with the system for the at least the predetermined amount of time.

16. The system of claim 11, wherein said first computing device is configured to sample the subset of the plurality of inventory trees by sampling inventory trees based on a one or more of industry, size of the inventory or location associated with each tree.

17. The system of claim 11, wherein said first computing device is configured to sample the subset of the plurality of inventory trees comprises sampling inventory trees based on industry, size of the inventory and location associated with each tree.

18. The system of claim 11, wherein said first computing device is further configured to normalize texts within the sampled subset before creating the consensus inventory tree.

19. The system of claim 11, wherein said first computing device is configured to determine that there is a consensus that the one or more features belong to the industry associated with the first user by determining that the one or more features are shared in a predetermined percentage of the sampled subset.

20. The system of claim 11, wherein said first computing device is configured to sample create the consensus inventory tree from the one or more features of the sampled subset by creating a majority-rule consensus inventory tree from the one or more features of the sampled subset.

* * * * *